United States Patent [19]

Gagle et al.

[11] 4,130,516

[45] Dec. 19, 1978

[54] HIGH DUCTILITY ASPHALT

[75] Inventors: Duane W. Gagle; Homer L. Draper, both of Bartlesville, Okla.

[73] Assignee: Phillips Petroleum Company, Bartlesville, Okla.

[21] Appl. No.: 676,259

[22] Filed: Apr. 12, 1976

[51] Int. Cl.$^2$ .................... C08L 95/00; C09D 3/24
[52] U.S. Cl. .................. 260/28.5 AS; 106/275; 106/279; 404/17.32; 260/745; 106/274
[58] Field of Search ............ 106/274, 275, 287 SC; 208/22, 44; 260/28.5 AS; 404/17, 32, 79

[56] References Cited

U.S. PATENT DOCUMENTS

| 1,264,932 | 5/1918 | Henderson | 106/274 |
|---|---|---|---|
| 1,265,108 | 5/1918 | Pickl | 106/274 X |
| 1,353,003 | 9/1920 | White, Jr. | 260/30.8 R |
| 1,830,486 | 11/1931 | Sadtler | 106/275 |
| 2,182,837 | 12/1939 | Bacon et al. | 404/79 |
| 2,478,162 | 8/1949 | Sommer | 106/273 N |
| 2,504,605 | 4/1950 | Thomas | 260/758 |
| 2,709,659 | 5/1955 | Werking | 260/38 X |
| 3,093,610 | 6/1963 | Wurstner et al. | 260/285 AS |
| 3,634,293 | 1/1972 | Bonitz | 260/28.5 AS |
| 3,738,853 | 6/1973 | Kopvillem et al. | 106/274 |
| 3,992,340 | 11/1976 | Bonitz | 260/28.5 AS |

*Primary Examiner*—Joan E. Welcome

[57] ABSTRACT

An asphalt composition having high ductility at low temperatures is obtained by hot-mixing asphalt and 3 to 7 wt. % of sulfur, based on the weight of asphalt, at temperatures below 300° F. Small amounts of rubber further increase the ductility.

4 Claims, No Drawings

HIGH DUCTILITY ASPHALT

The present invention relates to asphalt compositions with high ductility at low temperatures. One aspect of this invention relates to a process to make such an asphalt composition.

BACKGROUND OF THE INVENTION

It has been known for many years that asphaltic binders can be made by admixing 5 to 10 wt. % of sulfur with asphalt and subjecting the mixture to a heating step where the temperature of the mixture is kept at 500° F. for a considerable period of time. Such asphalt binders were reported to be more flexible in cold weather than an untreated asphalt, and such products were reported to be valuable in binding vegetable fibers, see for instance, U.S. Pat. No. 1,264,932.

In the specific application of asphalt compositions in modern road construction, asphalts must have certain properties as these compositions are to be used for public roads. Particularly in areas with severe winters, asphalts are required to have a very high ductility at low temperatures. Thus, for example, there is a requirement for the ductility of asphalt to be at least 8 cm for a 60/70 penetration asphalt at 39.2° F. in one area of the United States. A low ductility of an asphalt composition describes the possibility for the asphalt to become brittle at low temperatures. This property of asphalt is undesirable, particularly when the asphalt is used in road constructions that are exposed to heavy loads, also during the winter months.

THE INVENTION

It is thus one object of this invention to provide an asphalt composition having high ductility at low temperatures.

Another object of this invention is to provide a process to make a highly ductile asphalt composition.

These and other objects, features, advantages, details and embodiments of this invention will become apparent to those skilled in the art from the following description of the invention and the appended claims.

In accordance with this invention, we have now found that by incorporating 3-7 wt. % of sulfur into an asphalt and by hot-mixing these components at a temperature below 300° F., a considerable improvement in ductility over the original asphalt can be achieved.

Asphalt compositions obtained by admixing 3-7 wt. % of sulfur to the asphalt while maintaining a mixing temperature in the range of 250-300° F., more preferably 265-280° F., are presently preferred.

Furthermore, and in accordance with another embodiment of this invention, it has been found that the addition of small amounts of rubber to the composition further increases the ductility of the composition at low temperatures to very high values, in some instances to values of 150 cm and more. This is achieved without adversely affecting other required properties. Preferably, 0.5 to 1.5 wt. % of rubber is added to the composition in this embodiment. Rubbers useful for the addition are particularly random and tapered linear copolymers of butadiene and styrene having a styrene content of 15-35 wt. %. The most preferred rubber for this composition is presently a linear random butadiene/styrene copolymer containing 20-30 wt. % of styrene-derived units. The rubbers should not be coupled rubbers having three or more polymer chains extending from the coupling agent nucleus.

Yet another embodiment of this invention consists in a process for making an asphalt composition as defined above. This process comprises the step of blending 3-7 wt. % of sulfur and asphalt at a temperature below 300° F., particularly between 250-300° F., and most preferably between 265° and 280° F. The process is usually carried out by heating the asphalt to the desired temperature and adding the quantity of sulfur desired to the molten asphalt while stirring for a period of time that is sufficient for the complete mixture of the ingredients. This mixing usually takes about 20 minutes to 1 hour.

In a preferred embodiment of this process, rubber is incorporated in addition to the sulfur in the asphalt composition. The quantities and kinds of rubber employed are the same as those disclosed above in connection with the asphalt composition as such. The rubber is incorporated into the asphalt composition, preferably in finely divided form that is added to the molten asphalt either together with the sulfur or before or after the addition of the sulfur. The mixture is stirred until all the rubber is dispersed completely in the composition.

All the percentages given above, i.e., the percentages for the sulfur and the rubber, are based on the total weight of the composition including the sulfur and the rubber as 100%.

It is important for this invention that the asphalt composition neither during the mixing step in which the sulfur and the asphalt are blended, nor during any future process step, is subjected to a temperature above about 300° F. Particularly, it has been found that subjecting the composition to a temperature of 500° F. completely destroyed the advantageous ductility properties obtained.

For the purpose of this invention, any asphalt can be used. The improvements of this invention are, however, particularly significant for those asphalts having a penetration grade between 60/70 and 85/100, an R & B softening temperature of 100°-150° F. (38°-65° C.) and a ductility at 39.2° F. (4.5° C.) of 5-10.

The sulfur used for the purposes of this invention is used in the form of elemental sulfur. The particular configuration of the sulfur is insignificant. Preferably, and because of the accessability thereof, sulfur in finely divided form (flowers of sulfur) is the preferred form of sulfur to be used. When added to the asphalt, the sulfur is preferably in a fused state.

The invention will be still more fully understood from the following examples which are intended to illustrate further preferred embodiments of this invention but not to limit the scope thereof.

EXAMPLE I

Various asphalts from different sources as indicated in the table having different penetration grades were heated to 275° F. (135° C.). These asphalts were blended with elementary sulfur by adding the molten sulfur and stirring the mixture for about 30 minutes. The ductilities were measured in accordance with ASTM method D-113 at 39.2° F. (4.5° C.). The results are shown in the following table.

| Asphalt and Source | Sulphur Content vs. Ductility at 39.2° F (4° C) | | | | | |
|---|---|---|---|---|---|---|
| | Original Penetration Grade[1] | Ductility at 39.2° F (4° C) in cm. | | | | |
| | | 0 w% S | 3 w% S | 5 w% S | 7 w% S | 10 w% S |
| Phillips Kansas City, Missouri, Refinery | 40/50 | 4.0 | 4.8 | 5.8 | —[2] | 4.3 |
| Phillips Woods Cross, Utah, Refinery | 60/70 | 6.7 | 9.1 | 14.1 | — | 8.6 |
| Phillips Great Falls, Montana, Refinery | 60/70 | 7.5 | 10.0 | 14.6 | — | 10.8 |
| Phillips Kansas City, Missouri, Refinery | 85/100 | 11.0 | 19.3 | 38.4 | — | 16.8 |
| APCO | 85/100 | 8.1 | 14.1 | 17.9 | 11.6 | 8.9 |
| Southland | 85/100 | 11.6 | 35.3 | 67.4 | 57.3 | 19.7 |
| Chevron | 85/100 | 10.7 | 23.3 | 118.2 | 104.5 | 25.4 |
| Edgington Oil Co. | 85/100 | 20.4 | 150+ | 150+ | 150+ | 116.1 |
| Shell | 85/100 | 24.7 | 101.3 | 150+ | 91.6 | 31.5 |

[1] ASTM-D-5-73
[2] Not determined.

The data of the table show that the addition of 3 wt. % elemental sulfur increases low-temperature ductility of all the asphalts. At the 7 wt. % level for the sulfur content, some decrease can be noted from the peak of ductility reached at about 5 wt. % of sulfur. At 10 wt. % the ductility rapidly deteriorates.

EXAMPLE II

In this example the influence of the blending temperature on the ductility is determined. In all five runs a 60/70 penetration grade asphalt from the Phillips Petroleum Company Refinery in Great Falls, Montana was used. In Run 1, the control run, the asphalt as such was used for determination of the ductility. In Runs 2–5, a blend of this 60/70 penetration grade asphalt with 5 wt. % of sulfur was used employing blending times and temperatures as shown in the following table. The ductility, the penetration, and the ring and ball softening temperature of the asphalt and the asphalt/sulfur compositions were determined. The results are shown in the following Table II.

TABLE II

| Run No. | Blending Temperature | Blending Time, min. | Ductility cm | Penetration[2] | R&B Softening[1] | |
|---|---|---|---|---|---|---|
| | | | | | °F | °C |
| 1 | (Control) - | — | 7.5 | 64 | 120.5 | 49 |
| 2 | 275° F (135° C) | 30 | 9.9 | 97 | 115 | 46 |
| 3 | 275° F | 60 | 11.6 | | not measured | |
| 4 | 500° F (260° C) | 30 | 0.3 | 14 | 175.5 | 80 |
| 5 | 500° F | 240 | 0.4 | 10 | 192.5 | 89 |

[1] ASTM-D-36-70
[2] ASTM-D-5-73

The above-shown data indicate that a hot-mixing of the ingredients at a temperature of 275° F. (135° C.) for a period of 30–60 minutes has the desired effect of increasing the ductility of the untreated asphalt. In addition, the treatment produces a softer asphalt characterized by the higher penetration value. The softening point as such is only lowered by 3° C. Heating the blend at a temperature of 500° F. (260° C.), on the other hand, completely destroyed the desired effect and reduced the ductility to a value that renders the respective composition totally unacceptable for road construction purposes. A hard, brittle asphalt is obtained characterized both by very low ductility and very low penetration values.

EXAMPLE III

This example shows the effect of incorporating rubber into the composition of this invention. A series of blends was prepared using 5 wt. % of elemental sulfur and 1 wt. % of a linear random butadiene/styrene copolymer containing 70 wt. % of butadiene and 30 wt. % of styrene-derived units. The rubber is commercially available under the trademark Solprene 1206 from the Phillips Petroleum Company, Bartlesville, Oklahoma. Individual runs were carried out in which only sulfur and only rubber were used and the respective compositions were compared with compositions containing both sulfur and rubber. The asphalt used for all five runs, of which Run 1 was a control run with the asphalt containing no additive, was 60/70 penetration grade asphalt from the Phillips Petroleum Company Refinery in Great Falls, Montana. The rubber was incorporated into the molten asphalt in finely divided form at an asphalt temperature of 275° C. under stirring. The sulfur was introduced in fused state. This stirring was continued for about 30 minutes after the addition of additives. All percentages shown in the following table with the result are wt. % of the total composition.

TABLE III

| Run No. | Additive | Penetration at 77° F (25° C) | Ductility at 39.2° F (4.20 C) cm | R&B Softening Point, °F (°C) | |
|---|---|---|---|---|---|
| 6 | none (control) | 66 | 6.7 | 123 | (50.5) |
| 7 | 5% S | 103 | 14.1 | 117 | (47) |
| 8 | 1% rubber | 78 | 10.0 | 121 | (49.5) |
| 9 | 5% S, 1% rubber | 117 | 150+(1) | 114.5 | (45.5) |
| 10 | 5% S, 0.5% rubber | 116 | 13.7 | 115 | (46) |

(1) Limit of instrument.

The data shown above demonstrate a synergistic increase in ductility if 5 wt. % sulfur and 1 wt. % of the rubber defined were incorporated into the asphalt composition. The data also show a small decrease in the ring and ball softening temperature.

EXAMPLE IV

In this example the effect of another type of rubber on the low-temperature ductility of an asphalt composition in accordance with this invention was investigated. The rubber used was a 60/40 butadiene/styrene radial block copolymer containing 40 wt. % block polystyrene. The rubber used is commercially available under trademark Solprene 414 from the Phillips Petroleum Company, Bartlesville, Okla. The rubber used was compounded with $SO_2$ extract oil in a quantity of 70 wt. % oil and 30 wt. % rubber. The mixing conditions were the same as in the examples given above. Two different kinds of asphalt were used as shown in the table. The effect of the additive sulfur and the radial block copolymer on the low-temperature ductility is shown in the following table.

TABLE IV

| Run No. | Grade of Asphalt Penetration and Source | Sulfur wt. % | Rubber wt. % | Penetration | Ductility at 39.2° F (4° C) cm | R&B Softening Temperature ° F | ° C |
|---|---|---|---|---|---|---|---|
| 11 | (Control) Woods Cross, Utah, 60/70 | 0 | 0 | 66 | 6.7 | 123.5 | 50.5 |
| 12 | " | 5 | 0 | 103 | 14.1 | 117.5 | 47 |
| 13 | " | — | 1.0 | 65 | 6.8 | 123.0 | 50.5 |
| 14 | " | 5 | 0.5 | 90 | 11.8 | 118.5 | 48 |
| 15 | " | 5 | 1.0 | 99 | 14.5 | 119.0 | 48.3 |
| 16 | Kansas City, MO, 85/100 | 0 | 0 | 76 | 11.0 | 120 | 49 |
| 17 | " | 5 | 0 | 113 | 38.4 | 116 | 46.7 |
| 18 | " | 5 | 0.5 | 124 | 12.8 | 112 | 44.4 |
| 19 | " | 5 | 1.0 | 132 | 14.1 | 111 | 43.9 |

The data of this table show that the radial block copolymer alone did not affect the ductility of the asphalt at 39.2° F. in the case of the Woods Cross asphalt. However, the sulfur addition considerably increased the ductility of this low penetration grade asphalt. For the Kansas City high penetration grade asphalt, it even appears that the incorporation of the radial block copolymer rubber is detrimental as far as the low-temperature ductility of the sulfur-containing composition goes. For this reason it is preferred to incorporate a linear copolymer into the composition of this invention as explained in connection with Example III.

Reasonable variations and modifications that will become apparent to those skilled in the art can be made in this invention without departing from the spirit and scope thereof.

We claim:

1. A composition of matter obtained by hot-blending asphalt and about 5 wt. % of sulfur at a temperature below 300° F. further comprising about 1 wt. % of a rubber selected from the group consisting of natural rubber and synthetic rubber.

2. A composition in accordance with claim 1 wherein said rubber is a linear butadiene/styrene copolymer.

3. A process for the production of an asphalt composition which comprises hot-blending asphalt and about 5 wt. % of sulfur at a temperature below 300° F. and incorporating about 1 wt. % of a rubber selected from the group consisting of natural rubber and synthetic rubber into the composition.

4. A process in accordance with claim 3 wherein said rubber is a linear butadiene/styrene copolymer.

* * * * *